United States Patent
Naganath et al.

(10) Patent No.: US 10,554,593 B1
(45) Date of Patent: *Feb. 4, 2020

(54) ANALYSIS OF CONTENT SHARING IN A MESSAGING PLATFORM

(71) Applicant: Twitter, Inc., San Francisco, CA (US)

(72) Inventors: Aditya Krishna Naganath, New York, NY (US); Erik Steven Froese, Brooklyn, NY (US)

(73) Assignee: Twitter, Inc., San Francisco, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/858,897

(22) Filed: Dec. 29, 2017

Related U.S. Application Data

(63) Continuation of application No. 15/156,228, filed on May 16, 2016, now Pat. No. 9,860,199, which is a continuation of application No. 14/176,084, filed on Feb. 8, 2014, now Pat. No. 9,344,387.

(51) Int. Cl.
| | |
|---|---|
| *G06F 15/16* | (2006.01) |
| *H04L 12/58* | (2006.01) |
| *H04W 4/02* | (2018.01) |
| *H04W 4/06* | (2009.01) |

(52) U.S. Cl.
CPC .......... *H04L 51/043* (2013.01); *H04L 51/00* (2013.01); *H04L 51/04* (2013.01); *H04L 51/32* (2013.01); *H04W 4/02* (2013.01); *H04W 4/06* (2013.01)

(58) Field of Classification Search
CPC ....... H04L 51/00; H04L 51/04; H04L 51/043; H04L 51/32
USPC ................................. 709/202–207
See application file for complete search history.

(56) References Cited

U.S. PATENT DOCUMENTS

| | | | |
|---|---|---|---|
| 6,826,613 B1 | 11/2004 | Wang | |
| 8,516,591 B2* | 8/2013 | Fly | G06F 21/577 726/24 |
| 9,344,387 B1* | 5/2016 | Naganath | H04L 51/30 |
| 9,509,643 B1 | 11/2016 | Gade | |
| 9,639,608 B2 | 5/2017 | Freeman | |
| 9,860,199 B1* | 1/2018 | Naganath | H04L 51/30 |
| 2009/0234876 A1 | 9/2009 | Schigel | |
| 2012/0124139 A1* | 5/2012 | Dempski | G06Q 30/02 709/205 |
| 2012/0284340 A1 | 11/2012 | Young | |

(Continued)

OTHER PUBLICATIONS

Bandcamp; http://bandcamp.com/help/pro#view-location (accessed Jul. 22, 2014).

(Continued)

*Primary Examiner* — Bharat Barot
(74) *Attorney, Agent, or Firm* — Fish & Richardson P.C.

(57) ABSTRACT

A system and method for message analysis, including: receiving, from a client device, a reporting request identifying a first broadcasted message authored by a context account of a messaging platform; identifying, by a computer processor, engagement data corresponding to engagement with the first broadcasted message by a set of engaging accounts of the messaging platform that engaged with the first broadcasted message; generating, using the engagement data and by the computer processor, propagation data representing propagation of the first broadcasted message in a connection graph of the messaging platform; and providing the propagation data for the client device in response to the reporting request, where the client device is operable to display a visual representation of the propagation data.

20 Claims, 8 Drawing Sheets

(56) References Cited

U.S. PATENT DOCUMENTS

| | | |
|---|---|---|
| 2013/0073389 A1 | 3/2013 | Heath |
| 2013/0339457 A1 | 12/2013 | Freire |
| 2014/0201292 A1 | 7/2014 | Savage |
| 2014/0280624 A1 | 9/2014 | Dillingham |
| 2015/0067075 A1* | 3/2015 | Sheppard ................ H04L 51/32 709/206 |
| 2016/0029048 A1 | 1/2016 | Malone |

* cited by examiner

US 10,554,593 B1

ANALYSIS OF CONTENT SHARING IN A MESSAGING PLATFORM

BACKGROUND

The development and proliferation of sophisticated mobile computing devices such as smart phones and tablets have likely contributed to a sudden rise in the usage of social networking messaging platforms and applications. With increasingly powerful computing devices and extensive mobile networks, social networking has become available at any time and almost everywhere. Popular messaging platforms often provide functionality for users to draft and send messages (both synchronously and asynchronously) to other users. Other common features include the ability to "post" messages that are visible to one or more identified other users of the platform, or even publicly to any user of the platform without specific designation by the authoring user.

SUMMARY

In general, in one aspect, the invention relates to a method for message analysis. The method can include: receiving, from a client device, a reporting request identifying a first broadcasted message authored by a context account of a messaging platform; identifying, by a computer processor, engagement data corresponding to engagement with the first broadcasted message by a set of engaging accounts of the messaging platform that engaged with the first broadcasted message; generating, using the engagement data and by the computer processor, propagation data representing propagation of the first broadcasted message in a connection graph of the messaging platform; and providing the propagation data for the client device in response to the reporting request, where the client device is operable to display a visual representation of the propagation data.

In general, in one aspect, the invention relates to a system for message analysis. The system can include: a computer processor; and a message-analysis module executing on the computer processor and configured to enable the computer processor to: receive, from a client device, a reporting request identifying a first broadcasted message authored by a context account of a messaging platform; identify engagement data corresponding to engagement with the first broadcasted message by a set of engaging accounts of the messaging platform that engaged with the first broadcasted message; generate, using the engagement data, propagation data representing propagation of the first broadcasted message in a connection graph of the messaging platform; and provide the propagation data for the client device in response to the reporting request, where the client device is operable to display a visual representation of the propagation data.

In general, in one aspect, the invention relates to a non-transitory computer-readable storage medium having instructions for message analysis. The instructions are configured to execute on at least one computer processor to enable the computer processor to: send a reporting request identifying a first broadcasted message authored by a context account of a messaging platform; receive propagation data representing propagation of the first broadcasted message in a connection graph of the messaging platform, the propagation data generated from engagement data corresponding to engagement with the first broadcasted message by a set of engaging accounts of the messaging platform that engaged with the first broadcasted message; display, by a display device, a visual representation of the propagation data.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
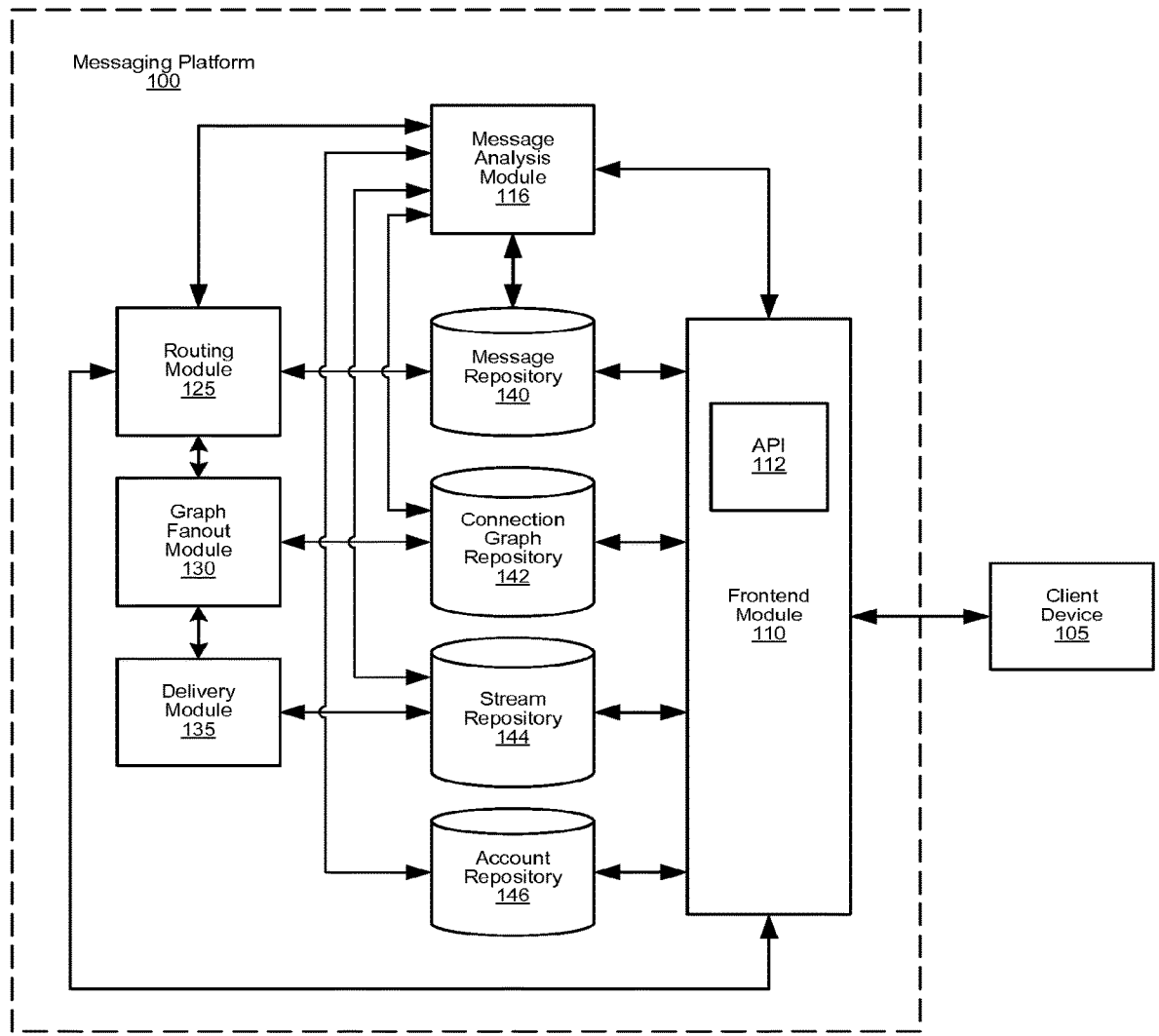
FIG. 1 shows a schematic diagram of a system, in accordance with one or more embodiments of the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the invention provide a method and system for generating and providing propagation data for a broadcasted message. The propagation data can represent propagation of the broadcasted message in a connection graph of a messaging platform. For example, the messaging platform can receive a reporting request from a client device that identifies a first broadcasted message authored by a context account of the messaging platform. A context account can be any account associated with and/or relevant to a request for content. In one example, the context account is an account of a user for which content is requested. In another example, the context account is an account or authoring account of a message from which a link was selected resulting in the request. The request may include an identifier that identifies the context account. The messaging platform can then identify engagement data corresponding to engagement with the first broadcasted message by a set of engaging accounts of the message platform. The messaging platform can then use the identified engagement data to generate the propagation data representing propagation of the first broadcasted message in the connection graph of the messaging platform. The generated propagation data can be provided by the messaging platform to the client device, which can then display a visual representation of the propagation data.

FIG. 1 shows a messaging platform (100) and a client device (105) in accordance with one or more embodiments of the invention. As shown in FIG. 1, the messaging platform (100) has multiple components including a frontend module (110) with an application programming interface (API) (112), a message analysis module (116), a routing module (125), a graph fanout module (130), a delivery module (135), a message repository (140), a connection graph repository (142), a stream repository (144), and an account repository (146). Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

The client device (105) and the messaging platform (100) can be in communicatively coupled with each other for purposes of exchanging content and other data. For example, the client device (105) and the messaging platform (100) can be configured for use on a wide area network. However, any variety of network configurations that facilitate the communication of electronic devices can be used.

In one or more embodiments, a user can interact with the messaging platform (100) through the client device (105). The messaging platform (100) can support connections from a variety of different client devices, such as desktop computers, mobile computers, mobile communications devices (e.g. mobile phones, smart phones, tablets), smart televisions, set-top boxes, and/or any other network enabled computing devices. The client device (105) can be any of a varying type, capabilities, operating systems, etc. Furthermore, the messaging platform (100) can concurrently accept connections from and interact with multiple client devices.

In one or more embodiments, the messaging platform (100) is a platform for facilitating real-time communication between one or more entities. For example, the messaging platform (100) may store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). The messaging platform (100) may be configured to enable users to communicate in "real-time", i.e., to converse with other users with a minimal delay and to conduct a conversation with one or more other users during simultaneous sessions. In other words, the messaging platform (100) may allow a user to broadcast messages and may display the messages to one or more other users within a reasonable time frame so as to facilitate a live conversation between the users. Recipients of a message may have a predefined graph relationship with an account of the user broadcasting the message. For example, the recipients of the message may be 'followers' of the user account broadcasting the message, meaning that the recipient has chosen to receive messages authored by the followed account in the recipient's message stream. A message stream may include content broadcasted by or engaged with by accounts having a predefined graph relationship with the context account in the connection graph.

In one or more embodiments, the user is not an account holder or is not logged in to an account of the messaging platform (100). In this case, the messaging platform (100) may be configured to allow the user to broadcast messages and/or to utilize other functionality of the messaging platform (100) by associating the user with a temporary account or identifier.

In one or more embodiments, the messaging platform (100) can track all messages broadcasted by each account of the messaging platform (100), as well as engagement data corresponding to engagement with the broadcasted messages. Engagement data can include any type of information describing activity with the broadcasted message or context account by an engaging account of the messaging platform (100).

Examples of engagement include, but are not limited to, rebroadcasting of the broadcasted messages by the engaging account, marking the broadcasted message to indicate that is a favorite message or liked by the engaging account, responding to the broadcasted message by an engaging account, mentioning or referencing the broadcasted message by the engaging account, a number of followers/connections/friends of the context account within the engaging account's connection graph, an indication that the context account is a favorite account by the engaging account, prior engagement with a conversation between the context account and the engaging account, and/or an amount of any other activity associated with one or more unviewed messages.

In one or more embodiments, the messaging platform (100) can maintain data describing each broadcasted message as well as the engagement data corresponding to each broadcasted message in the message repository (140), where it can be edited and accessed by the messaging platform (100). Each broadcasted message can be associated with a unique message identifier used to identify the broadcasted message.

Figure 2:
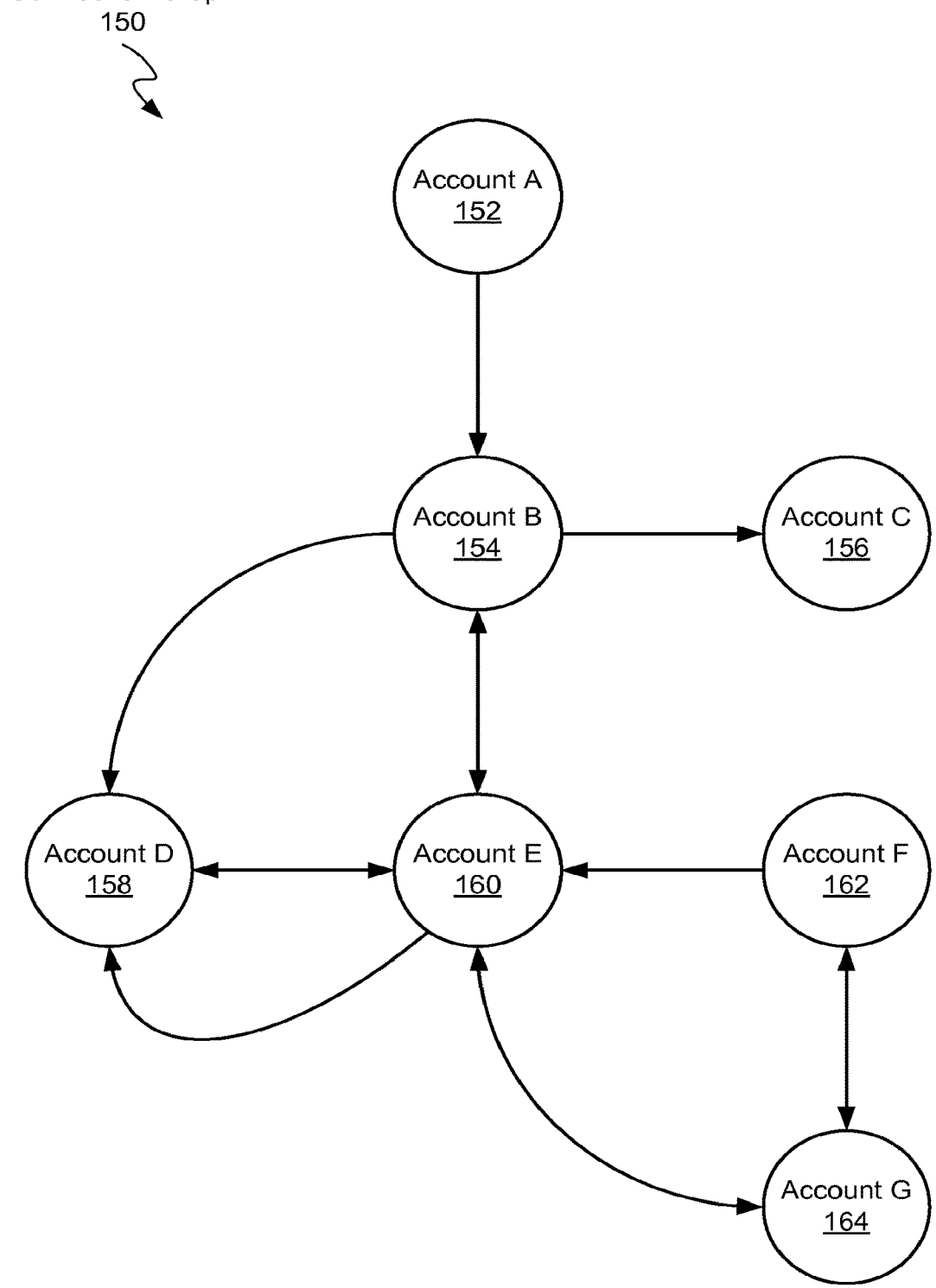
FIG. 2 shows an example depiction of a connection graph in accordance with one or more embodiments of the invention.

Relationships between accounts of the messaging platform (100) can be represented by a connection graph. FIG. 2 shows an example depiction of a connection graph (150) in accordance with one or more embodiments of the invention. In one or more embodiments, the connection graph repository (142) is configured to store one or more connection graphs. As shown in FIG. 2, the connection graph (150) includes multiple components including nodes representing accounts of the messaging platform (100) (i.e., Account A (152), Account B (154), Account C (156), Account D (158), Account E (160), Account F (162), Account G (164)) and edges connecting the various nodes.

The connection graph (150) is a data structure representing relationships (i.e., connections) between one or more accounts. The connection graph (150) represents accounts as nodes and relationships as edges connecting one or more nodes. A relationship may refer to any association between the accounts (e.g., following, friending, subscribing, tracking, liking, tagging, and/or etc.). The edges of the connection graph (150) may be directed and/or undirected based on the type of relationship (e.g., bidirectional, unidirectional), in accordance with various embodiments of the invention.

Many messaging platforms include functionality to broadcast streams of messages to one or more accounts based at least partially on a connection graph representing relationships between those accounts (see FIG. 2). A stream may be a dynamic list of messages associated with one or more accounts or can reflect any arbitrary organization of messages that is advantageous for the user of an account. For purposes of this disclosure, a "message" can include a user authored message and/or any content (multimedia, text, etc.) broadcasted/posted by an account of a messaging platform.

Returning to FIG. 1, in one or more embodiments, the message analysis module (116) includes functionality to generate propagation data representing the propagation of the first broadcasted message in a connection graph of the messaging platform (100). For example, a user of the messaging platform (100) may wish to receive propagation data describing propagation of a broadcasted message authored by the user or another user of the messaging platform (100).

The user can use the client device (105) to communicate with the messaging platform (100) to request the propagation data. For example, the message analysis module (116) can be configured to provide the client device (105) with data that the client device (105) can use to render a reporting interface that enables a user to select a broadcasted message and request propagation data for the selected broadcasted message. The reporting interface can cause the client device (105) to transmit a reporting request identifying the selected broadcasted message to the message platform (100). For example, the reporting request can include a unique message identifier identifying the broadcasted message.

The messaging platform (100) can receive, from the client device (105), the reporting request identifying the first broadcasted message authored by a context account of the messaging platform (100). Upon receiving the reporting request, the message analysis module (116) can identify engagement data corresponding to engagement with the first broadcasted message by a set of engaging accounts of the messaging platform (100) that engaged with the first broadcasted message. For example, the message analysis module (116) can use the unique message identifier included in the reporting request to search the message repository (140) and gather the engagement data corresponding to the first broadcasted message identified by the unique message identifier.

The message analysis module (116) can then use the engagement data to generate propagation data representing propagation of the first broadcasted message in a connection graph of the messaging platform 100. For example, the message analysis module (116) can calculate various propagation metrics based on the identified engagement data that indicate the propagation of the first broadcasted message in the connection graph.

The message analysis module (116) can provide the propagation data for the client device (105) in response to the reporting request. The client device (105) is operable to display a visual representation of the propagation data and thus, upon receiving the propagation data, can display a visual representation of the propagation data for the user.

In one or more embodiments, the message analysis module (116) includes functionality to calculate a propagation distance for the broadcasted message from the identified engagement data. The propagation distance can represent a distance traveled by the broadcasted message. The distance traveled can include a geographic distance or, alternatively, a distance in the connection graph.

To calculate the propagation distance, the message analysis module (116) can determine an initial location associated with the first broadcasted message. The initial location can represent a geographic location or a location in the connection graph. For example, the initial location can represent a geographic location of a user when the user submitted the broadcasted message to the messaging platform (100) or a geographic location associated with the context account. Alternatively, the initial location can identify the node in the connection graph representing the context account that authored the broadcasted message.

In one or more embodiments, the message analysis module (116) can determine the initial location from the client device (102) used to author the broadcasted message. For example, the client device (102) can include a Global Positioning System (GPS) component that can determine the location of the client device (102), which can be transmitted to the messaging platform (100) when the broadcasted message is submitted to the messaging platform (100).

Alternatively, in one or more embodiments, the message analysis module (116) can determine the initial location based on user profile data associated with the context account. For example, a user associated with the context account may have provided their location when creating the context account and this provided location can be used as the initial location.

In one or more embodiments, the message analysis module (116) can infer the initial location from account activity associated with the context account. For example, the location of account directly connected to the context account can be used to infer the initial location. Alternatively, the text of messages authored by the context account and/or accounts directly connected to the context account can be analyzed to infer the initial location.

The message analysis module (116) can also determine an engagement location representing a location where an engagement with the first broadcasted message was submitted to the messaging platform (100) by an engaging account of the set of engaging accounts. Similar to the initial distance, the engagement location can represent either a geographic location or a location in the connection graph. For example, the engagement location can represent a geographic location of a user when the user engaged with the broadcasted message or a geographic location associated with the engaging account. Alternatively, the engagement location can identify the node on the connection graph representing the engaging account.

The message analysis module (116) can calculate the propagation distance between the initial location and the engagement location. For example, the message analysis module (116) can calculate the geographic distance (e.g., miles, meters, feet, etc.) between the initial location and the engagement location. Alternatively, the message analysis module (116) can calculate the distance in the connection graph between the initial location and the engagement location (e.g., the degrees of separation between the initial location and the engagement location, the number of nodes between the initial location and the engagement location, etc). The message analysis module (116) can include the propagation distance in the propagation data provided to the client device (105).

In one or more embodiments, the propagation distance can represent the distance between two separate engagements with the broadcasted message. For example, the initial location can be a location where a first engagement with the first broadcasted message was submitted to the messaging platform (100) by an engaging account of the set of engaging accounts, and the engagement location can be a location where a second engagement with the first broadcasted was submitted to the messaging platform (100). The calculated propagation distance can then represent the distance between the first engagement and the second engagement.

In one or more embodiments, the message analysis module (116) includes functionality to calculate a velocity of the broadcasted message from the identified engagement data. The velocity of the broadcasted message can indicate a rate at which the broadcasted message traveled a specified distance such as the propagation distance from an initial location to an engagement location. The distance can include a geographic distance or, alternatively, a distance in the connection graph. For example, the velocity of the broadcasted message can represent the rate at which the broadcasted message traveled from San Francisco to New York. Alternatively, the velocity of the broadcasted message can represent the rate at which the broadcasted message traveled in the connection graph (e.g., from a first node associated with the context account that authored the broadcasted message to a second node associated with an engaging user account, to a third node, to a fourth node, and so on).

To calculate the velocity of the broadcasted message, the message analysis module (116) can determine a broadcast time representing a time at which the first broadcasted message was submitted to the messaging platform (100) by the context account. The message analysis module (116) can also determine an engagement time representing a time at which the engagement was submitted to the messaging platform (100) by the engaging account.

The message analysis module (116) can use the broadcast time and the engagement time to calculate an elapsed time indicating an amount of time clapsed from the broadcast time to the engagement time. For example, the message analysis module (116) can calculate the hours, minutes, and seconds that elapsed from the broadcast time to the engagement time.

The message analysis module (116) can then calculate the velocity of the first broadcasted message based on the propagation distance and the elapsed time. For example, the message analysis module (116) can calculate the velocity of the broadcasted message using a simple formula such as distance divided by time, thus indicating a rate at which the first broadcasted message travels either a geographic distance or a distance in the connection graph. The message analysis module (116) can include the velocity of the broadcasted message in the propagation data provided to the client device (105). Further, although distance divided by time is given as an example for calculating velocity, this is just one possibility and is not meant to be limiting. One skilled in the art would recognize that any type of formula for velocity can be used.

In one or more embodiments, the message analysis module (116) can calculate the velocity and/or propagation distance of the broadcasted message based on an engagement threshold being met, rather than a single engagement. For example the propagation distance can represent the distance between the initial location and an engagement location where a predetermined threshold number of engagements occurred within a specified distance of each other, rather than just a singular engagement. Requiring the engagement threshold to be met removes outlier engagements that can skew the reporting results. For example, requiring that at least 150 engagements occur at a specified location before the location is considered an engagement location provides a much more meaningful propagation distance than a propagation distance representing the distance to an engagement location where only a single engagement occurred.

Likewise, the message analysis module (116) can calculate velocity based on the engagement threshold being met, rather than a single engagement occurring. For example, the engagement time can represent the time at which the predetermined number of engagements occurred within a specified distance of each other, rather than the occurrence of a single engagement.

In one or more embodiments, the engagement threshold number can be a predetermined static number. For example, the engagement threshold can be set to 150 engagements. Alternatively, in one or more embodiments, the engagement threshold can be set based on the population of accounts at a specified location. For example, the engagement threshold can be higher for areas with a higher population of accounts, such as New York City, and lower for areas with a lower population of accounts, such as Anchorage, Ak.

In one or more embodiments, the engagement threshold can be dynamically based on the number previous engagements that occurred at a geographic location. For example, the engagement threshold can be higher for locations where a relatively high number of engagements have previously occurred, and lower for locations where a relatively low number of engagements have occurred.

In one or more embodiments, the message analysis module (116) includes functionality to calculate an intensity of the first broadcasted message indicating a proportion of accounts within a geographic location that engaged with the first broadcasted message. For example, the intensity of the first broadcasted message can indicate the proportion of accounts in New York that engaged with the broadcasted message.

To accomplish this, message analysis module (116) can gather the number of accounts in a specified geographic location (e.g., a country, state, and/or city) and determine the proportion of the accounts in the specified area that engaged with the broadcasted message. The intensity of the broadcasted message within the geographic location can be based on the proportion of user accounts within the geographic location that engaged with the broadcasted message. For example, the higher the proportion, the greater the intensity and vice versa.

In one or more embodiments, the message analysis module (116) includes functionality to determine the distribution of the engagement with the broadcasted message based on the degree of separation from the context account. In the connection graph, two nodes can have a degree of separation from each other based on the number of nodes that separate the two nodes. For example, two nodes that are directly connected can be considered to have one degree of separation from each other. Alternatively, two nodes that are not directly connected to each other but are indirectly connected to each other through a third node can be considered to have two degrees of separation.

Figure 3:
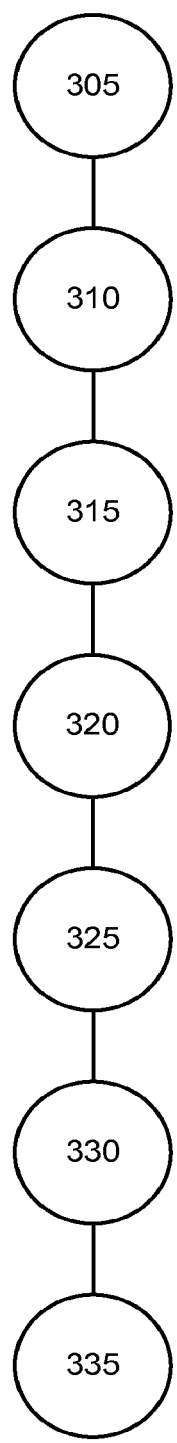
FIG. 3 shows an example depiction of nodes in a connection graph separated by various degrees of separation.

FIG. 3 shows an example depiction of nodes in a connection graph separated by various degrees of separation. As shown, seven nodes can be connected in a connection graph. There is one degree of separation between node (305) and node (310) because node (305) is directly connected to node. Node (315), however, is separated from node (305) by (310) and thus node (305) is separated by two degrees of separation from node (315). This same concept applies to each of the nodes. For example, node (310) is in one degree of separation from node (315) and (305) because node (310) is directly connected to node (305) and node (315). Likewise, node (335) is in one degree of separation from node (330) because node (335) and node (330) are directly connected, however node (335) is in six degrees of separation from node (305) because they are separated by five other nodes.

Returning to a discussion of FIG. 1, message analysis module (116) can identify a subset of the set of engaging accounts that are within an equivalent degree of separation from the context account. For example, the message analysis module (116) can identify a subset of the engaging accounts that are within one degree of separation from the context account. The message analysis module (116) can then calculate the percentage of the set of engaging accounts that are in the subset of the set of engaging accounts.

The message analysis module (116) can repeat this process for each or multiple degrees of separation from the context account. The message analysis module (116) can then determine a distribution of engagement for the first broadcasted message across the various degrees of separation. This distribution can identify the percentage of the total engagements with the broadcasted message performed by each subset of users that are within an equivalent degree of separation from the context account. The message analysis module (116) can include this distribution of engagement in the propagation data provided to client device (105).

In one or more embodiments, the message analysis module (116) includes functionality to compare the distribution of engagement for the broadcasted message to the distribution of engagement of a different broadcasted message. This comparison can illustrate a variance between the distribution of engagement between the two messages.

To accomplish this, the message analysis module (116) can identify a second broadcasted message. For example, the message analysis module (116) can access the message repository (140) to identity the second broadcasted message. In one or more embodiments, the second broadcasted message can be identified at random. Alternatively, the second broadcasted message can be selected by a user.

The message analysis module (116) can then identify a distribution of engagement for the second broadcasted message using, for example, the same or similar method as described to determine the distribution of engagement of the first broadcasted message. The message analysis module (116) can then calculate a performance variance from the distribution of engagement of the first broadcasted message and the distribution of engagement of the second broadcasted message. For example, the message analysis module (116) can calculate the difference between the percentage of users in a subset of users that are within an equivalent degree of separation from the context account for the first broadcasted message from the percentage of message in a subset of users that are within the same equivalent degree of separation from the context account for the second broadcasted message.

In one or more embodiments, the message analysis module (116) includes functionality to determine a demographic profile for the context account based on demographic data gathered from the set of engaging accounts. A demographic profile can identify at least one demographic criteria shared by at least two of the set of engaging accounts that define the demographic profile. The identified at least one demographic criteria can be a common characteristic amongst the users that engaged with the broadcasted message and therefore be assumed as common for users that do or would like content broadcasted by the context account to be included in their message stream.

To determine the demographic profile, the message analysis module (116) can gather demographic data associated with the engaging accounts from the account repository (146) and analyze the demographic data to identify demographic criteria shared by at least two of the set of engaging accounts. The message analysis module (116) can then select one or more of the identified demographic criteria to define the demographic profile of the first broadcasted message.

The message analysis module (116) can select the demographic profile criteria to define the demographic profile in numerous ways. For example, in one or more embodiments, the message analysis module (116) can select the demographic profile criteria that are shared by the greatest number of engaging accounts. Alternatively, the message analysis module (116) can select the demographic profile criteria shared by a certain number or proportion of the engaging users.

In one or more embodiments, the message analysis module (116) includes functionality to provide recommendations and/or provide targeted advertisements to users based on the demographic profile of the context account. For example, the demographic profile of the context account can be used to assume that most or all users that match the demographic profile of the context account will like the context account and/or content provided by the context account. The message analysis module (116) can target advertisements and make recommendations based on this assumption.

To accomplish this, the message analysis module (116) can identify at least one account that matches the demographic profile of the context account. For example, the message analysis module (116) can access the account repository (146) to gather and analyze demographic data associated with a set of user accounts of the messaging platform to identify the at least one account that matches the demographic profile of the context account.

Upon identifying the at least one account, the message analysis module (116) can present an advertisement associated with the context account to the at least one account. For example, in a situation where the context account is associated with a marketer or advertiser, the demographic profile of the context account can be used to identify other users that are assumed to like the marketer/advertiser and advertisements advertising their products can be presented to the identified user.

Alternatively, the message analysis module (116) can present the at least one account with a recommendation to connect with the context account. For example, the message analysis module (116) can identify user accounts that match the demographic profile of the context account and that are also not directly connected to the context account. The message analysis module (116) can make an assumption that these identified user accounts, while not currently connected to the context account, should like the context account based on their inclusion in the demographic profile of the context account. The message analysis module (116) can present these accounts with a recommendation to connect to the context account, fbr example by selecting to receive messages broadcasted by the context account.

In one or more embodiments, the message analysis module (116) includes functionality to calculate a temporal frequency rate at which engagement with the first broadcasted message occurs. The temporal frequency rate can indicate a common or average time between engagement with the first broadcasted message. The message analysis module (116) can gather and analyze engagement times of the engagements to identify the temporal frequency rate. The message analysis module (116) can include the temporal frequency rate in the propagation data provided to the client device (105).

In one or more embodiments, the message analysis module (116) includes functionality to identify at least one engaging account of the set of engaging accounts that has the largest number of connections. The messaging analysis module (116) can gather and analyze data indicating the number of connections that each engaging account has to identify the one or more engaging account that has the largest number of connections. The messaging analysis module (116) can include data identifying the identified engaging accounts, as well as the number of connections that the engaging accounts have, in the propagation data provided to the client device (105).

In one or more embodiments, the message analysis module (116) includes functionality to generate aggregated propagation data representing the propagation of the multiple broadcasted messages in the connection graph of the messaging platform (100). For example, the aggregated propagation data can represent propagation of multiple broadcasted messages authored by the context account.

To accomplish this, the message analysis module (116) can identify one or more broadcasted message authored by the context account. The message analysis module (116) can then identify engagement data corresponding to engagement with the one or more broadcasted messages by accounts of the messaging platform that engaged with the broadcasted message. The message analysis module (116) can generate the aggregated propagation data from the engagement data corresponding to engagement with the one or more broadcasted messages. The message analysis module (116) can provide the aggregate propagation data to the client device (105), where it can be displayed to a user.

Figure 4:
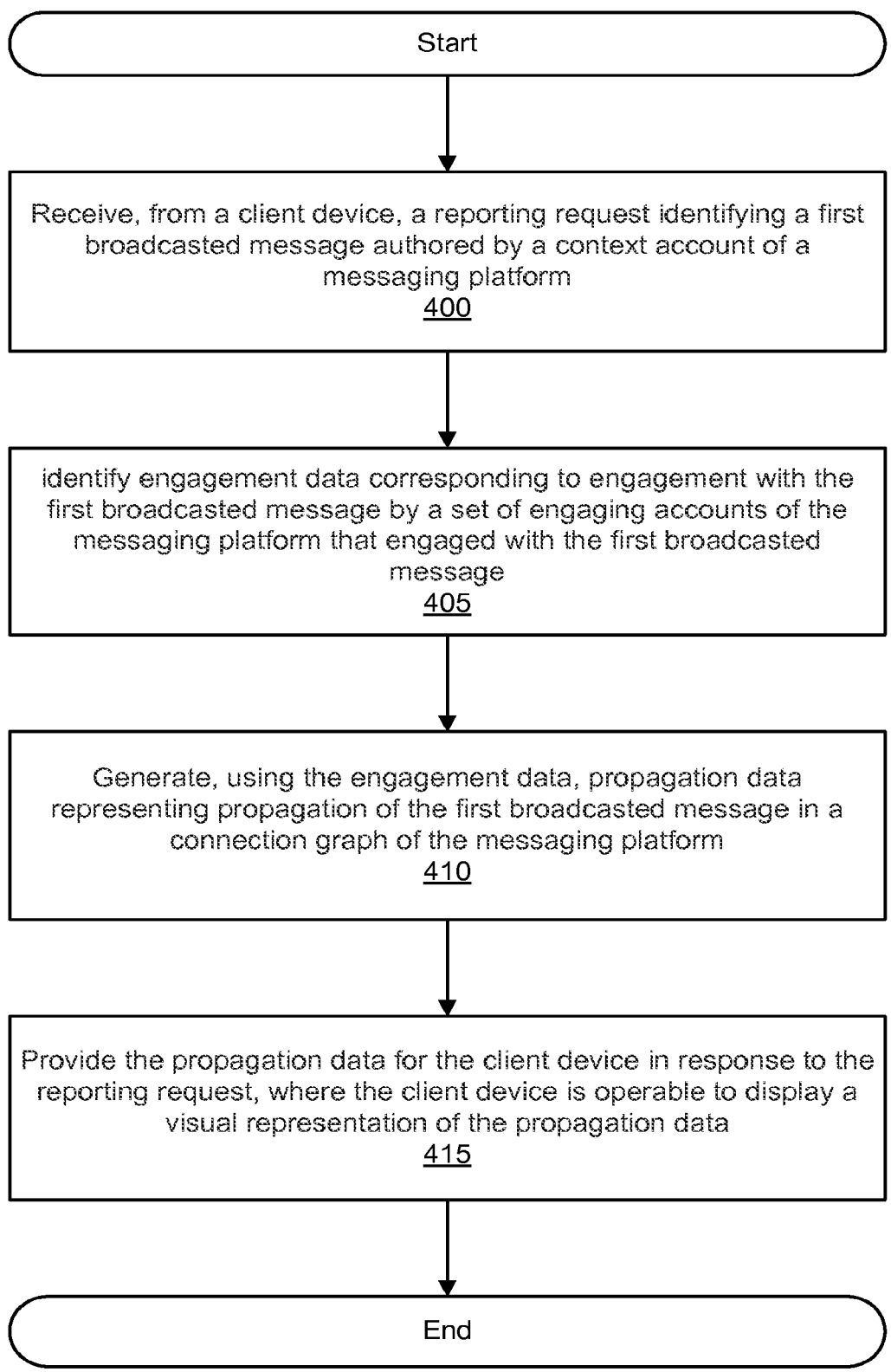
FIG. 4 shows a flowchart in accordance with one or more embodiments of the invention.

FIG. 4 shows a flowchart of a method for message analysis (e.g., in a messaging platform). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 4 should not be construed as limiting the scope of the invention.

In STEP (400), a reporting request is received from a client device. A reporting request can be a request from a client device for propagation data representing propagation of a first broadcasted message authored by a context account of a messaging platform. For example, a user of the messaging platform can request propagation data for a message broadcasted by the user.

The reporting request can include a unique message identifier identifying the first broadcasted message for which propagation data is requested. For example, the user can identify the first broadcasted message when requesting the propagation data and the unique identifier identifying the first broadcasted message can be included resulting reporting request.

In STEP (405), engagement data corresponding to engagement with the first broadcasted message is identified. The engagement data can correspond to engagement with the first broadcasted message by a set of engaging accounts of the messaging platform that engaged with the first broadcasted message. For example, the engagement data can include data regarding re-broadcasting, responding to, etc., of the first broadcasted message by the set of engaging accounts. The engagement data can include data regarding the engagement as well as data about the engaging accounts.

In STEP (410), propagation data representing propagation of the first broadcasted message in a connection graph of the messaging platform is generated. The propagation data can include any of a variety of data representing propagation of the first broadcasted message. For example, the propagation data can include statistics regarding the engaging accounts, such as the total number, location(s), number of followers, number of broadcasted messages authored by, etc. of engaging account.

In one or more embodiments, the engagement data can identify the top engaging accounts. For example, the engagement data can identify the engaging account or accounts that have the greatest number of followers. Alternatively, the engagement data can identify each engaging account that has a number of followers exceeding a threshold number. For example, the engagement data can identify each account that has over 100 k followers.

In one or more embodiments, the propagation data can include a propagation distance indicating a distance that the broadcasted message traveled. For example, the propagation distance can represent a physical distance from an initial location at which the broadcasted message was broadcasted to an engagement location at which an engagement with the broadcasted message occurred. Alternatively, the propagation distance can represent a physical distance between two separate engagements with the broadcasted message.

In one or more embodiments, the propagation distance can represent a distance in the connection graph. For example, the propagation distance can represent the degrees of separation between a node representing the context account that authored the broadcasted message and a node representing an engaging account that engaged with the broadcasted message. Alternatively, the propagation distance can represent the degrees of separation between nodes representing two different engaging accounts.

In one or more embodiments, the propagation data can include a velocity of the broadcasted message. The velocity can be based on a propagation distance and time elapsed for the broadcasted message to travel the propagation distance. The velocity can represent a rate at which the broadcasted message travels a physical distance or, alternatively, a distance in the connection graph. For example, the velocity can represent the rate at which the broadcasted message traveled a physical distance.

In one or more embodiments, the propagation data can include an intensity of the broadcasted message. The intensity can indicate the proportion of accounts within a geographic location that engaged with the broadcasted message. For example, the intensity can indicate the proportion of accounts within a city, state, country, etc. that engaged with the broadcasted message. The higher the proportion of user accounts in the geographic location that engaged with the broadcasted message, the greater the intensity of engagements within the geographic location.

In one or more embodiments, the propagation data can include a distribution of engagement with the broadcasted message by engaging accounts within an equivalent degree of separation from the context account that authored the broadcasted message. For example, the propagation data can include the proportion of the engagements that were performed by engaging accounts within one, two, three, etc. degrees of separation from the context account. The resulting distribution of engagement can present the distribution of the engagements based on the degree of separation from the context account.

In one or more embodiments, the propagation data can include the variance between the distribution of engagement of a first broadcasted message and the distribution of engagement of a second broadcasted message. This variance can include the difference in proportion of engagements based on degrees of separation from the respective context accounts that authored the first and second broadcasted messages. In one or more embodiments, the first and second broadcasted messages can be messages authored by the same context account. Alternatively, the first and second broadcasted messages can be authored by different accounts.

In one or more embodiments, the engagement data can include a demographic profile for the context account based on demographic data gathered from the engaging accounts. The demographic profile can include demographic criteria commonly shared by the engaging accounts. For example, the demographic profile can indicate that the demographic profile of males ages 18-35 were commonly shared amongst the engaging accounts. The demographic profile can then be used to target advertisements or make recommendations.

In one or more embodiments, the propagation data can include a temporal frequency rate at which engagement with the first broadcasted message occurred. This can include an average time interval at which engagement with the first broadcasted message occurs.

In one or more embodiments, the propagation data can be aggregated propagation data representing propagation of multiple broadcasted messages authored by the context account. In this type of embodiment, the propagation data can be generated from engagement data corresponding to engagement with multiple broadcasted messages authored by the context account.

In STEP (415), the propagation data is provided to the client device in response to the reporting request, where the client device can display a visual representation of the propagation data. The propagation data can be presented in numerous ways, such as using graphs, charts, maps, etc.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Figure 5:
FIG. 5 shows an example of a visual representation of propagation data on a map in accordance with one or more embodiments of the invention.

FIG. 5 shows an example of a visual representation of propagation data on a map. As shown, a world map is presented with engagement points indicating the location where engagement with the broadcasted message occurred. This can include locations where users were when they viewed, rebroadcasted, replied to, etc. the broadcasted message.

As shown, the size of the various engagement points varies. The difference in size can represent the number or density of engagements that occurred at the specified location. For example, the engagement point (505) over New York is large in comparison to the other engagement points. This can indicate that a large number of engagements occurred in New York. In contrast, the engagement point (510) over San Francisco is much smaller that the engagement point (505). This indicates that a smaller number of engagements occurred in San Francisco than in New York.

In one or more embodiments, the size of an engagement point can represent the actual number of engagements. For example, the larger the number of engagements, the larger the engagement point. In one or more embodiments, however, the size of the engagement point can indicate the proportion of the engagements that occurred at the location. Thus, a large number of engagements can be represented by a small engagement point if the large number represents only a small proportion of the total engagements with the broadcasted message.

In one or more embodiments, the color of the engagement point can indicate the intensity of the engagement at a geographic location. For example, the engagement point can be presented as a darker color to indicate a greater intensity at the location. For example, as shown, a greater number of engagements occurred in New York than in San Francisco, but a greater proportion of the user accounts in San Francisco may have engaged with the broadcasted message than in New York. Thus the engagement point (510) can be presented darker that the engagement point (505) to indicate the higher intensity in San Francisco than in New York.

In one or more embodiments, the color of the engagement point can indicate the degrees of separation of the engagements from the context account. For example, the color of the engagement point can be darker to indicate a higher average degree of separation.

In one or more embodiments, the engagement data can be presented to enable a user to view the detail in finer or more focused detail. For example, the engagement points can be selected to present the propagation data represented by the engagement point in greater detail. Alternatively, a user can select a portion of a map to zoom into a more detailed view of the map and the propagation data.

Figure 6:
FIG. 6 shows an example of a visual representation of propagation data on a map zoomed to a selected region in accordance with one or more embodiments of the invention.

FIG. 6 shows an example of a visual representation of propagation data on a map zoomed to a selected region. A map of only the United States is shown, rather than a world map as presented in FIG. 5. This can be the result of user selecting to view propagation of the broadcasted message in greater detail in the United States. In one or more embodiments, a user can zoom in further to be presented with propagation data of a region in even greater detail. For example, a user can select to view the propagation data in a specified state or city.

In FIG. 6, the engagement points (505 and 510) are each shown in greater detail and granularity. For example, the engagement point (505), which was presented as a singular engagement point in FIG. 5, is shown to actually include three different engagement points located near each other. A user can then select any of these three engagement points to receive greater detail. Likewise, the engagement point (510) is shown to actually include four separate engagement points.

In addition to viewing the propagation data in a map view, in one or more embodiments, the propagation data can be presented as a list, chart, graph, etc. For example, propagation statistics such as propagation distance, velocity, intensity, etc. can be presented in any way known in the art.

Figure 7:
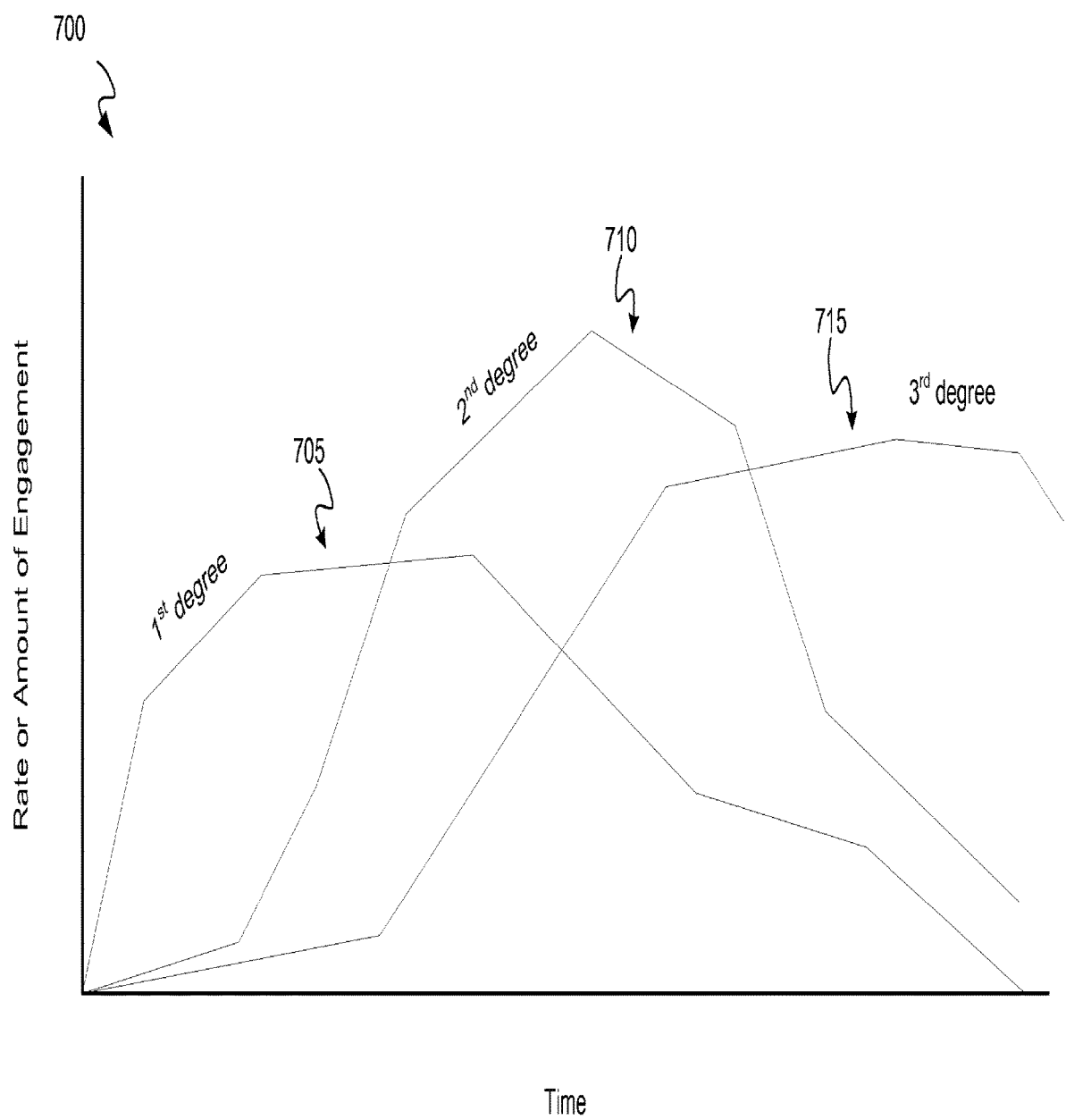
FIG. 7 shows an example visual representation of propagation data on a chart representing interactions grouped by degrees of separation from the context account in accordance with one or more embodiments of the invention.

FIG. 7 shows an example visual representation of propagation data on a chart representing engagements grouped by degrees of separation from the context account. As shown, the graph (700) presents the rate of engagement with a broadcasted message as a function of time. Further, the graph (700) presents three distinct data sets, each representing engagements from engaging accounts with an equivalent degree of separation from the context account. For example, the engagements represented by the dataset (705) were by accounts with one degree of separation from the context account. The dataset (710) represents engagements from user accounts with two degrees of separation of the context account. Finally, the dataset (715) represents engagements from user accounts with three degrees of separation from the context account. Presenting the engagement data in this manner provides a visual representation of the broadcasted message's propagation through the connection graph. For example, the graph (700) illustrates that the rate of engagement is highest initially with user accounts with one degree of separation from the context account, but as time goes on, engagement with user accounts with two degrees of separation from the context account increases while engagement with the user accounts with one degree of separation decrease. Similarly, engagement with user accounts with three degrees of separation with the context account increases as engagement with user accounts with two degrees of separation decreases.

Embodiments of the invention may be implemented on one or more computing systems including mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments of the invention.

Figure 8:
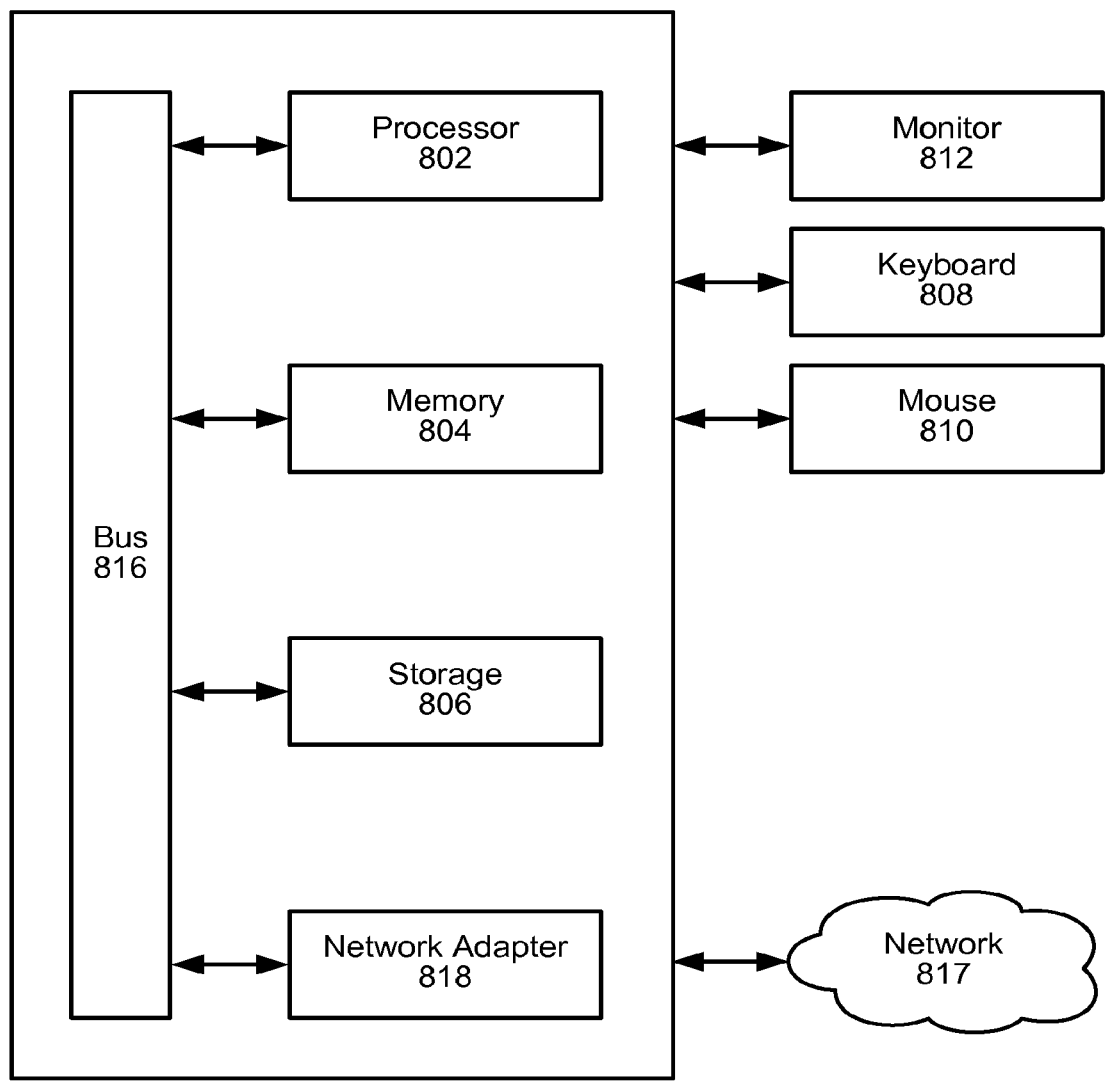
FIG. 8 shows a computer system in accordance with one or more embodiments of the invention.

For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions. For example, the computer processor(s) may be one or more cores or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. The computing system (800) may be connected to a network (814) (e.g., a local area network (LAN), a wide area network (WAN) such as the Internet, mobile network, or any other type of network) via a network interface connection (818). The input and output device(s) may be locally or remotely connected (e.g., via the network (812)) to the computer processor(s) (802), memory (804), and storage device(s) (806).

One or more elements of the aforementioned computing system (800) may be located at a remote location and connected to the other elements over a network (814). Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIG. 1) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIG. 1) and/or flowcharts (e.g., FIG. 4). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A system comprising:
one or more computers and one or more storage devices storing instructions that are operable, when executed by the one or more computers, to cause the one or more computers to perform operations comprising:
identifying engagement data representing multiple engagements with a first message by a plurality of respective engaging accounts of a messaging platform, the first message having been broadcasted by a first account of the messaging platform, including identifying at least one of the multiple engagements as a rebroadcasting of the first message by a respective engaging account;
identifying, from demographic data for each engaging account in the plurality of respective engaging accounts, one or more demographic criteria;
determining, from the one or more demographic criteria, one or more shared demographic criteria, wherein each shared demographic criterion is shared by two or more engaging accounts of the plurality of engaging accounts;

generating, from the one or more shared demographic criteria, a demographic profile;

identifying a second account of the messaging platform that matches the demographic profile; and providing, by the system and to the second account, as a consequence at least of identifying the second account, content provided to the messaging platform by the first account, other than the first message.

2. The system of claim 1, the operations further comprising:

providing, by the system and to the second account, as a consequence at least of identifying the second account, a recommendation to connect with the first account.

3. The system of claim 1, wherein generating a demographic profile comprises:

selecting one or more demographic criteria from the one or more shared demographic criteria, wherein the selected one or more demographic criteria are shared by a greatest number of engaging accounts out of every shared demographic criteria.

4. The system of claim 1, wherein generating a demographic profile comprises:

selecting one or more demographic criteria from the one or more shared demographic criteria, wherein the selected one or more demographic criteria are shared by a number of engaging accounts exceeding a predetermined value or predetermined proportion of all of the engaging accounts.

5. The system of claim 1, wherein the content is a message or other content that was previously broadcasted by the first account of the messaging platform.

6. The system of claim 1, wherein the multiple engagements further comprise a respective engaging account replying to the first message.

7. The system of claim 1, wherein the multiple engagements further comprise a respective engaging account mentioning the first message in a second message.

8. The system of claim 1, wherein the second account is not in the plurality of engaging accounts.

9. One or more non-transitory computer storage media storing instructions that when executed by one or more computers cause the one or more computers to perform operations comprising:

identifying engagement data representing multiple engagements with a first message by a plurality of respective engaging accounts of a messaging platform, the first message having been broadcasted by a first account of the messaging platform, including identifying at least one of the multiple engagements as a rebroadcasting of the first message by a respective engaging account;

identifying, from demographic data for each engaging account in the plurality of respective engaging accounts, one or more demographic criteria;

determining, from the one or more demographic criteria, one or more shared demographic criteria, wherein each shared demographic criterion is shared by two or more engaging accounts of the plurality of engaging accounts;

generating, from the one or more shared demographic criteria, a demographic profile;

identifying a second account of the messaging platform that matches the demographic profile; and providing, to the second account, as a consequence at least of identifying the second account, content provided to the messaging platform by the first account, other than the first message.

10. The computer storage media of claim 9, the operations further comprising:

providing, by the system and to the second account, as a consequence at least of identifying the second account, a recommendation to connect with the first account.

11. The computer storage media of claim 9, wherein generating a demographic profile comprises:

selecting one or more demographic criteria from the one or more shared demographic criteria, wherein the selected one or more demographic criteria are shared by a greatest number of engaging accounts out of every shared demographic criteria.

12. The computer storage media of claim 9, wherein generating a demographic profile comprises:

selecting one or more demographic criteria from the one or more shared demographic criteria, wherein the selected one or more demographic criteria are shared by a number of engaging accounts exceeding a predetermined value or predetermined proportion of all of the engaging accounts.

13. The computer storage media of claim 9, wherein the content is a message or other content that was previously broadcasted by the first account of the messaging platform.

14. The computer storage media of claim 9, wherein the multiple engagements further comprise a respective engaging account replying to the first message.

15. The computer storage media of claim 9, wherein the multiple engagements further comprise a respective engaging account mentioning the first message in a second message.

16. The computer storage media of claim 9, wherein the second account is not in the plurality of engaging accounts.

17. A method comprising:

identifying engagement data representing multiple engagements with a first message by a plurality of respective engaging accounts of a messaging platform, the first message having been broadcasted by a first account of the messaging platform, including identifying at least one of the multiple engagements as a rebroadcasting of the first message by a respective engaging account;

identifying, from demographic data for each engaging account in the plurality of respective engaging accounts, one or more demographic criteria;

determining, from the one or more demographic criteria, one or more shared demographic criteria, wherein each shared demographic criterion is shared by two or more engaging accounts of the plurality of engaging accounts;

generating, from the one or more shared demographic criteria, a demographic profile;

identifying a second account of the messaging platform that matches the demographic profile; and providing, to the second account, as a consequence at least of identifying the second account, content provided to the messaging platform by the first account, other than the first message.

18. The method of claim 17, further comprising:

providing, by the system and to the second account, as a consequence at least of identifying the second account, a recommendation to connect with the first account.

19. The method of claim 17, wherein generating a demographic profile comprises:

selecting one or more demographic criteria from the one or more shared demographic criteria, wherein the selected one or more demographic criteria are shared by a greatest number of engaging accounts out of every shared demographic criteria.

20. The method of claim 17, wherein generating a demographic profile comprises:

selecting one or more demographic criteria from the one or more shared demographic criteria, wherein the selected one or more demographic criteria are shared by a number of engaging accounts exceeding a predetermined value or predetermined proportion of all of the engaging accounts.

\* \* \* \* \*